United States Patent
Eigenmann et al.

(10) Patent No.: US 7,875,192 B2
(45) Date of Patent: Jan. 25, 2011

(54) SLURRY FLOW DIVIDER

(75) Inventors: Pius N. Eigenmann, Plymouth, MN (US); Stephan Barclay Meydell, III, Maple Grove, MN (US); David A. Hauch, Afton, MN (US)

(73) Assignee: Carter Day International, Inc., Minneapolis, MN (US)

(*) Notice: Subject to any disclaimer, the term of this patent is extended or adjusted under 35 U.S.C. 154(b) by 489 days.

(21) Appl. No.: 11/935,678

(22) Filed: Nov. 6, 2007

(65) Prior Publication Data

US 2008/0151681 A1    Jun. 26, 2008

Related U.S. Application Data

(60) Provisional application No. 60/871,055, filed on Dec. 20, 2006.

(51) Int. Cl.
*B01D 21/00* (2006.01)

(52) U.S. Cl. ............ 210/767; 137/561 A; 137/599.01; 209/1; 209/158; 209/172; 209/172.5; 210/97; 210/130; 210/153; 210/322; 210/542; 210/521; 210/801; 210/802; 241/21; 241/75

(58) Field of Classification Search .......... 137/561 R, 137/561 A, 599.01, 601.15, 601.18; 209/17, 209/18, 58, 172, 172.5, 173, 268, 273, 1, 209/158; 210/97, 130, 153–156, 161, 322, 210/434, 456, 513, 522, 541, 542, 767, 770, 210/800–803, 521; 241/20, 21, 38, 39, 68, 241/69, 75, 79
See application file for complete search history.

(56) References Cited

U.S. PATENT DOCUMENTS

| | | | |
|---|---|---|---|
| 1,871,853 A | 8/1932 | Kennedy | |
| 2,429,925 A * | 10/1947 | Clifford | ............ 209/157 |
| 3,037,629 A | 6/1962 | Fontein et al. | |
| 3,050,341 A | 8/1962 | Whitney, Jr. | |
| 3,265,442 A | 8/1966 | Willis, Jr. et al. | |
| 3,728,872 A | 4/1973 | Thore | |
| 3,960,732 A | 6/1976 | Lippert et al. | |
| 4,085,776 A * | 4/1978 | Derrick, Jr. | ............ 137/561 A |
| 4,191,500 A | 3/1980 | Oberg et al. | |
| 4,497,345 A | 2/1985 | Lees | |
| 4,747,943 A | 5/1988 | Giffard | |
| 4,782,857 A | 11/1988 | Bieri | |
| 4,964,950 A | 10/1990 | Niskanen | |
| 5,204,009 A | 4/1993 | Rowland | |
| 5,265,347 A | 11/1993 | Woodson et al. | |

(Continued)

*Primary Examiner*—Joseph W Drodge
(74) *Attorney, Agent, or Firm*—Frederikson & Byron, P.A.

(57) ABSTRACT

A slurry dividing apparatus is configured to divide a main slurry stream into smaller constituent slurry streams, wherein each stream contains a desired proportion of suspended solids. The dividing apparatus includes a main flow channel and a plurality of branch flow channels extending upward from a flow divider that terminates an upper end of the main flow channel. The main slurry stream enters the main flow channel, at an inlet opening thereof, and is decelerated, by an upward extension and expanding cross-section of the main flow channel, before reaching the flow divider and being divided into the smaller constituent slurry streams flowing within the plurality of branch flow channels. Each of the smaller streams flows up and then over a weir, which extends across an upper portion of each of the branch flow channels, and then down into a corresponding discharge flow channel of the apparatus.

23 Claims, 5 Drawing Sheets

U.S. PATENT DOCUMENTS

| | | |
|---|---|---|
| 5,611,150 A | 3/1997 | Yore, Jr. |
| 5,894,996 A * | 4/1999 | Williams .................... 241/20 |
| 6,027,146 A | 2/2000 | Kurimoto |
| 6,063,296 A * | 5/2000 | Ackerman et al. .......... 210/767 |
| 6,290,433 B2 | 9/2001 | Poncelet et al. |
| 6,372,092 B1 | 4/2002 | Bubik |
| 6,540,911 B1 | 4/2003 | Bajema |
| 6,938,357 B2 | 9/2005 | Hauch |
| 6,953,529 B2 | 10/2005 | Weir |
| 6,986,849 B2 | 1/2006 | Irvine |
| 7,021,336 B2 | 4/2006 | Burrows et al. |
| 7,048,525 B2 | 5/2006 | Brick et al. |
| 2005/0235889 A1 | 10/2005 | Martin et al. |

\* cited by examiner

SLURRY FLOW DIVIDER

RELATED APPLICATION

This application claims priority to U.S. provisional application Ser. No. 60/871,055, which was filed on Dec. 20, 2006, and which is hereby incorporated by reference, in its entirety.

FIELD OF THE INVENTION

The present disclosure pertains to controlling the flow of slurries and more particularly to dividing a relatively large slurry stream into smaller constituent slurry streams.

BACKGROUND

Slurry streams comprising particulates suspended in a transport fluid are found in many industries. For example, the manufacture of plastics typically involves extruding raw, melted plastic material from an extruder and then forming the raw plastic into particles. The plastic particles are entrained in a cooling transport fluid, which is typically water, to form a slurry. The water then carries the particulates to other locations in the plastics manufacturing plant for further processing, including but not limited to removal of undesirable materials (e.g., agglomerates) and dewatering, that is, removal of some portion of the transport fluid from the slurry. After dewatering, the plastic particles are transported to a dryer to remove moisture.

SUMMARY OF THE INVENTION

Embodiments of the invention include a slurry dividing apparatus useful for dividing a slurry stream into two or more constituent slurry streams. In some embodiments, the apparatus includes a main flow channel with a slurry inlet opening and an inlet zone in fluid communication with, and extending from, the inlet opening. A deceleration zone may be provided in fluid communication with, and extending upward from, the inlet zone toward an upper end of the main flow channel. A flow divider terminating the upper end of the main flow channel may be provided to divide the slurry stream into two or more branch flow channels. In certain embodiments, a weir extends across an upper portion of each of the branch flow channels to equalize the pressure in each of the branch flow channels. Embodiments of the invention also include an apparatus having such a flow divider in combination with an agglomerate removal and dewatering units and methods of separating a slurry stream.

BRIEF DESCRIPTION OF THE DRAWINGS

The following drawings are illustrative of particular embodiments of the invention and therefore do not limit the scope of the invention. The drawings are not to scale (unless so stated) and are intended for use in conjunction with the explanations in the following detailed description. Embodiments of the invention will hereinafter be described in conjunction with the appended drawings, wherein like numerals denote like elements.

DETAILED DESCRIPTION

The following detailed description is exemplary in nature and is not intended to limit the scope, applicability, or configuration of the invention in any way. Rather, the following description provides practical illustrations for implementing exemplary embodiments of the invention.

Figure 1A:
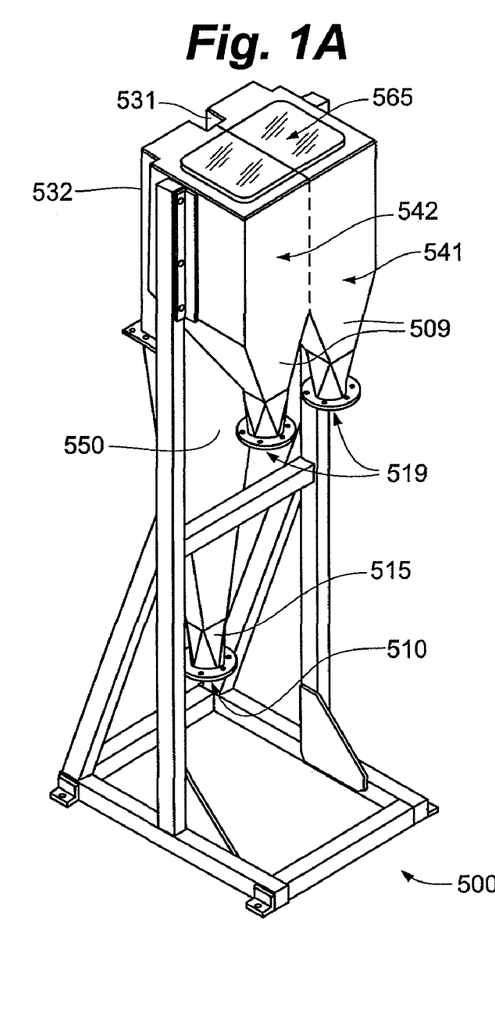
FIG. 1A is a perspective view of a slurry dividing apparatus in accordance with some embodiments of the present invention.
Figure 1B:
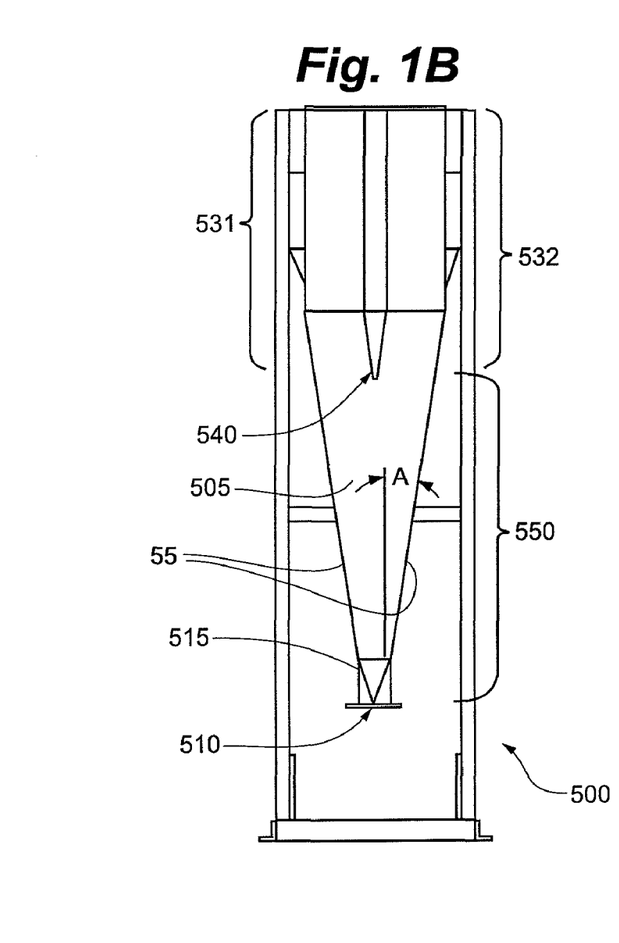
FIG. 1B is a frontal elevation view of the slurry dividing apparatus shown in FIG. 1A.

FIG. 1A is a perspective view of a slurry dividing apparatus 500, according to some embodiments of the present invention; and FIG. 1B is a frontal elevation view of dividing apparatus 500. FIGS. 1A-B illustrate apparatus 500 including a main flow channel 550 extending upward, preferably vertically, a flow divider 540 terminating an upper end of main flow channel 550, and a pair of branch flow channels 531, 532 in fluid communication with main flow channel 550 and extending upward, preferably vertically, from flow divider 540. Accordingly, slurry encountering slurry divider 540 will be split as it is traveling in an upward, vertical direction. The flow divider 540 is useful for separating a slurry stream into two or more constituent parts. As shown, the flow divider 540 comprises the inner walls of branch flow channels 531, 532. In other embodiments, flow divider 540 may comprise a single vertically oriented planar member.

Branch flow channels 531, 532 may be provided in any relative cross-sectional sizes. For example, if a slurry stream is to be split into roughly two equivalent streams, the cross-sectional area of branch flow channels 531, 532 may be approximately equal. Other stream split ratios and corresponding branch flow channel cross-sectional areas (e.g., 60/40, 70/30) may be provided as desired.

FIGS. 1A-B further illustrate main flow channel 550 including a slurry inlet opening 510, an inlet zone 515, which extends upward from the opening 510, and a deceleration zone 505 extending upward from inlet zone 515 toward flow divider 540; an increasing cross-sectional area of deceleration zone 505 decelerates slurry flow for division into constituent slurry streams flowing within branch channels 531, 532. According to the illustrated embodiment, opposing sidewalls 55 of deceleration zone 505 expand outward with increasing elevation in order to reduce slurry flow velocity, at flow divider 540, to a value just above that which would maintain the solids of the slurry in suspension, for a minimum anticipated slurry flow rate at inlet opening 510. Without intending to be bound by theory, the density difference between the suspended particles and the transporting fluid of the slurry will generally determine the minimum velocity required to maintain the solids of the slurry in suspension. Further, the height of the deceleration zone may depend on both the anticipated inlet velocity and the ideal reduced velocity at the top of the deceleration zone. In general, embodiments of the flow divider will work within a large range of inlet velocities. For example, for pellet slurry applications, inlet velocities may generally be between about 10 to about 20 feet per second and the velocity in the deceleration zone could be reduced by a factor of about 10 to 1. Other slurry applications could deviate significantly from this range.

In some embodiments, each of branch flow channels 531, 532 has a cross-sectional area of approximately one half of this maximum cross-sectional area of the deceleration zone. With further reference to FIG. 1B, it may be appreciated that sidewalls 55 gradually taper outward, in a linear fashion, at an angle A, which is preferably less than or equal to approximately 10 degrees, in order to prevent boundary layer separation between inlet zone 515 and deceleration zone 505 which can lead to turbulent flow that may cause separation of the solids suspended in the slurry. In some embodiments, the slurry stream is decelerated in deceleration zone 505 until it reaches laminar flow. In certain embodiments, the deceleration zone 505 is sized and shaped to decelerate the slurry stream to the minimum velocity that maintains particle suspension.

FIG. 1A further illustrates slurry dividing apparatus 500 including a pair of discharge flow channels 541, 542. According to the illustrated embodiment, each of discharge flow channels 541, 542 is in fluid communication with a corresponding branch flow channel 531, 532, and, with reference to FIG. 1C, it may be appreciated that the constituent slurry streams flowing upward within each of branch channels 531, 532, when reaching an upper portion thereof, will spill over a weir 503 and into discharge channels 541, 542, respectively. In some embodiments, weir 503 may be included in separate sections corresponding with each branch flow channel. With reference back to FIG. 1A, an optional observation window 565 may provide a view of the flow of the slurry streams over weirs 503. Weirs 503 are preferably horizontally plumb and located at approximately the same elevation such that each slurry stream flows at the same depth over the corresponding weir 503, and an approximately equivalent head pressure is maintained across branch channels 531, 532. Such equivalent head pressure allows the slurry stream to be split according to the relative cross-sectional area of the branch channels 531, 532, as discussed above. In some embodiments, the slurry has been decelerated in the deceleration zone 505 to such an extent that the constituent slurry streams are in laminar flow when they encounter weirs 503.

Figure 1C:
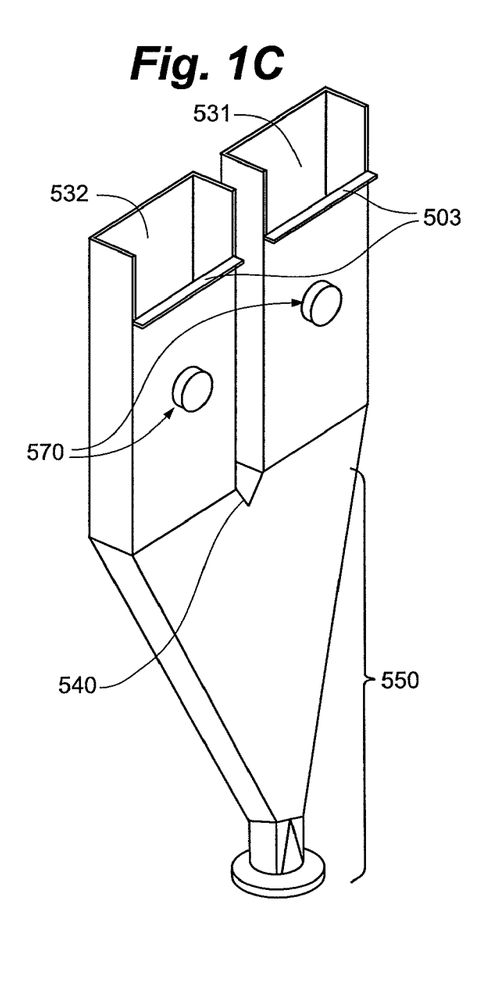
FIG. 1C is a perspective view of a portion of the slurry dividing apparatus shown in FIG. 1A.
Figure 1D:
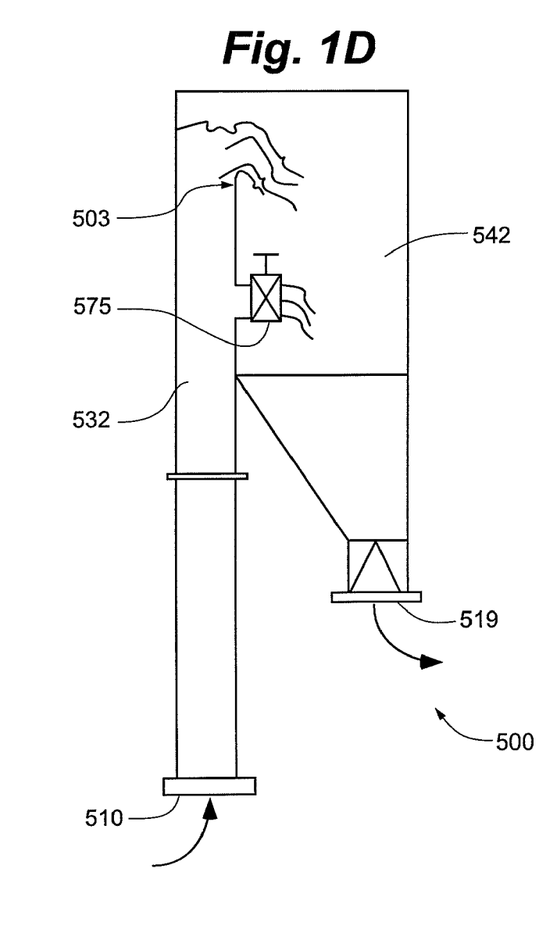
FIG. 1D is a side section view through the slurry dividing apparatus shown in FIG. 1A.

With further reference to FIG. 1C, in conjunction with FIG. 1D, which is a side section view through apparatus 500, optional bypass flow channels 570 are shown extending between each of branch flow channels 531, 532 and the corresponding discharge flow channel 541, 542. Although only one is shown in FIG. 1D, a valve 575 is provided for each of optional bypass flow channels 570; when valve 575 is opened the corresponding optional bypass channel 570 provides a flow pathway from the corresponding branch flow channel 531, 532 to the corresponding discharge flow channel 541, 542, which bypasses the corresponding weir 503. According to the illustrated embodiment one of valves 575 may be opened to short circuit one of the constituent slurry streams, which is flowing upward in the corresponding branch channel 531, 532, directly to the corresponding discharge flow channel 541, 542 and thereby increase a flow rate thereof.

With further reference to FIG. 1A, each of discharge flow channels 541, 542 is shown including an acceleration zone 509 extending downward, preferably vertically, toward a corresponding slurry outlet opening 519. According to the illustrated embodiment, acceleration zones 509 have cross-sectional areas that decrease with decreasing elevation in order to accelerate flow back to a velocity which provides for efficient transporting of the constituent streams out from outlets 519 to subsequent processing stations.

It should be noted that although each of inlet and outlet openings 510, 519 are shown having round cross-sections, which may be preferred for coupling with standard piping delivering slurries into and out from apparatus 500, the invention is not so limited and any suitable shape of cross-section may be employed for these openings. Furthermore, although main flow channel 550, branch flow channels 531, 532 and discharge flow channels 541, 542 are shown having rectangular cross-sections, again the invention is not so limited and any suitable shape of cross-section may be employed for these channels. Embodiments of the present invention may further include more than two branch flow channels and discharge flow channels to divide a slurry stream into more than two constituent streams.

Embodiments of the invention also include methods of separating a slurry stream into two or more constituent parts. In some embodiments, the method includes the steps of causing the slurry to flow through a deceleration zone to decelerate the slurry stream and dividing the slurry into a first slurry stream and a second slurry stream with a flow divider. In some embodiments, each slurry stream enters independent agglomerate removal and dewatering units after the slurry divider.

Figure 2A:
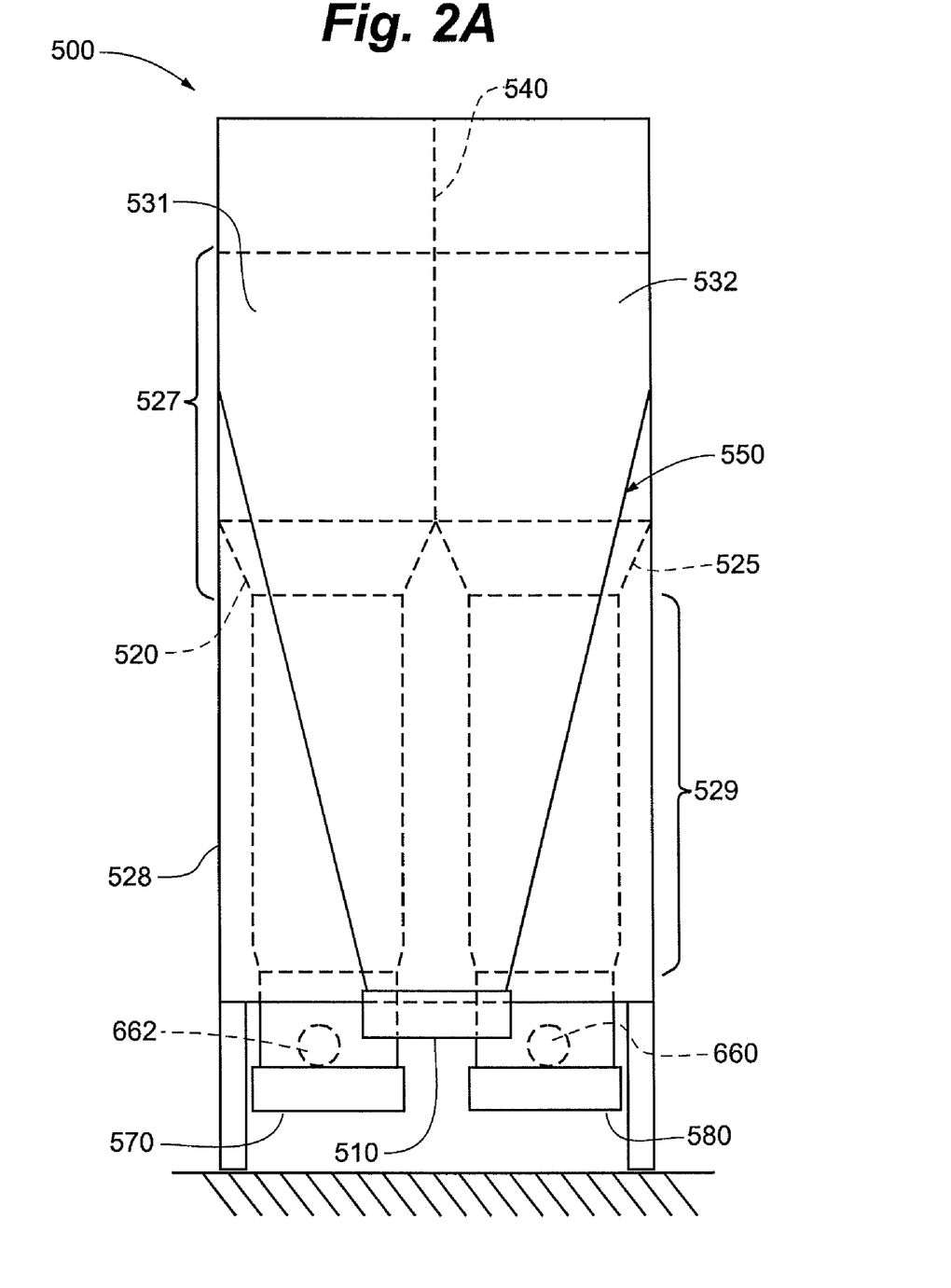
FIG. 2A is a frontal elevation schematic view of an apparatus in accordance with some embodiments of the invention.
Figure 2B:
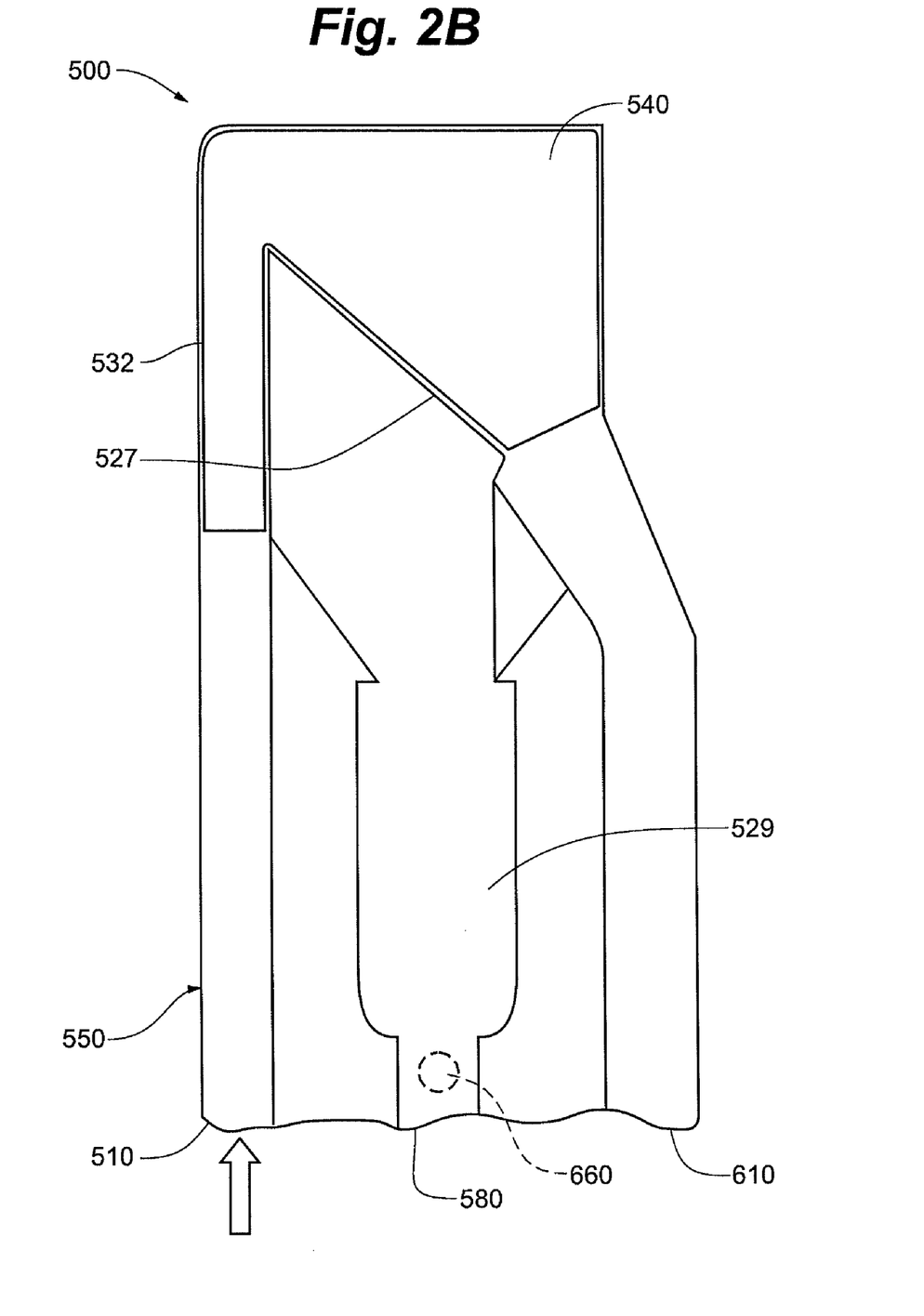
FIG. 2B is a side cross-sectional schematic view of an apparatus in accordance with some embodiments of the invention.

As shown in FIGS. 2A and 2B, in certain embodiments the independent agglomerate removal and dewatering units are provided within the same apparatus 500 as the slurry flow divider. In such embodiments, each slurry stream passing over weirs 503 (as described above) encounters a separate agglomerate removal and dewatering units 520, 525 in an agglomerate removal zone 527 and a dewatering zone 529. Each agglomerate removal unit and dewatering unit may be contained within a single housing, such as housing 528 shown in FIG. 2A. Examples of agglomerate removal and dewatering units useful for utilization with some embodiments of the invention will be further described below. After traveling through the agglomerate removal and dewatering units, the particulates and transport fluid from each stream may exit the apparatus separately, such as at first stream fluid component exit 570, second stream fluid component exit 580, first stream particulate component exit 662, and second stream particulate component exit 660, as shown in FIG. 2A. The particulates exiting at the first and second stream particulate component exits may then independently proceed to individual dryers for further moisture removal.

The configuration of the agglomerate removal and dewatering units can take any suitable form useful for removing agglomerates and dewatering, respectively. An illustrative apparatus is described in commonly assigned U.S. Pat. No. 6,063,296, entitled "Agglomerate Removal and Dewatering Apparatus," which is incorporated by reference herein.

Figure 2C:
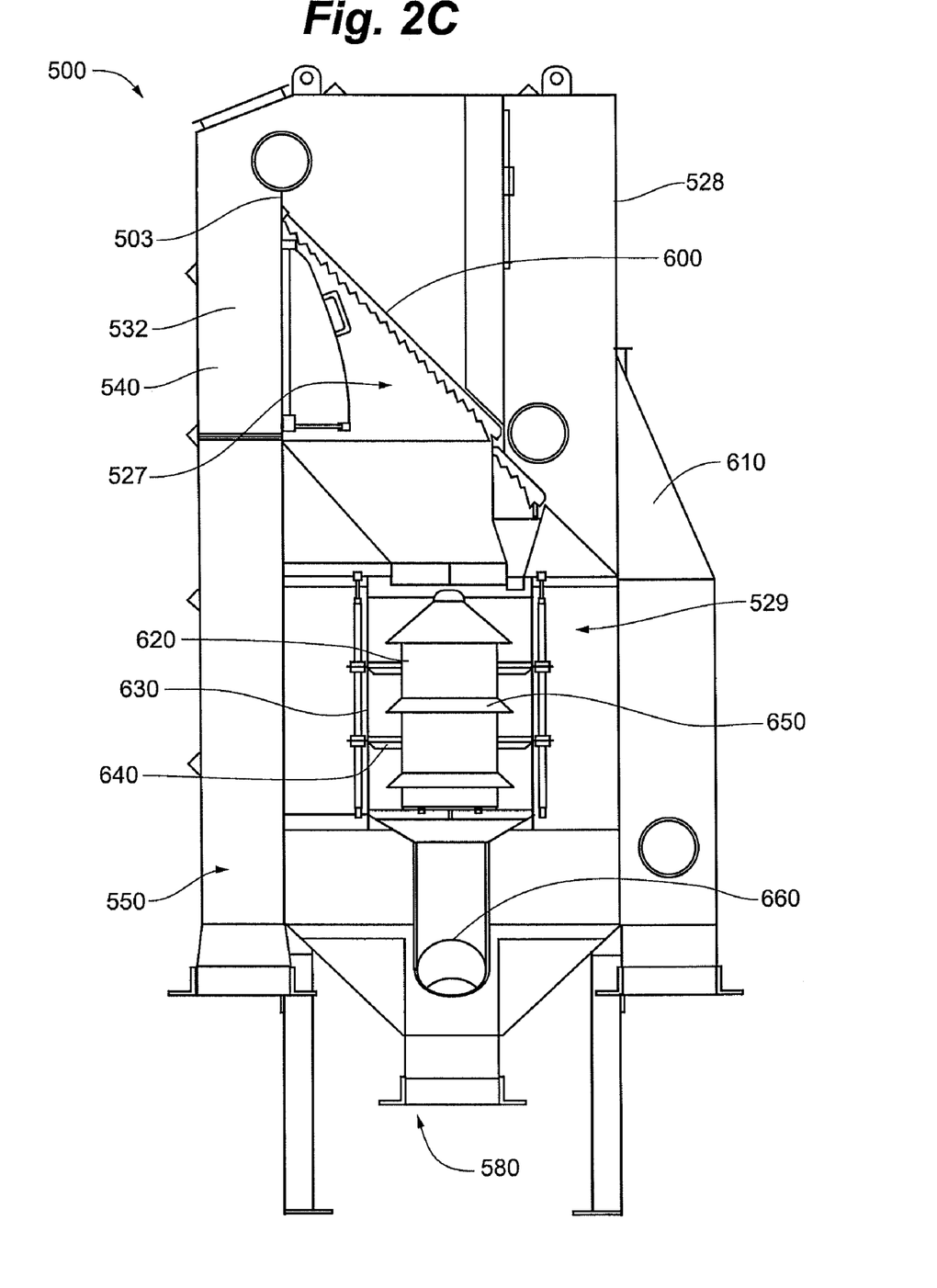
FIG. 2C is a side cross-sectional view of an apparatus in accordance with some embodiments of the invention.

In the embodiment of FIG. 2C, in such an apparatus the constituent slurry streams pass over weirs 503 and in to an agglomerate removal zone 527 and encounter a screening apparatus within the agglomerate removal zone. In some embodiments, screening apparatus comprises at least a first screen 600. Agglomerates present in the constituent slurry streams pass over the screen and out an agglomerate exit 610 while the slurry transport fluid and desired particulates pass through the screen and flow on to the dewatering zone 529.

Continuing with the embodiment shown in FIG. 2C, apparatus 500 includes a dewatering unit in the dewatering zone 529. The dewatering unit includes a central tower 620 having a substantially cylindrical configuration. The central tower is surrounded by a substantially cylindrical screen 630 having a plurality of screening apertures sized to allow flow of the transport fluid through the screen but not the particulates entrained in the fluid. The screen includes a plurality of vertically spaced apart flanges 640 extending inwardly toward the tower. The tower includes a plurality of outwardly extending flanges 650. In operation, the fluid flow will enter the dewatering unit from the screen of the agglomerate removal unit. The particles will bounce back and forth between the flanges and the tower and screen, causing the transport fluid to separate from the particles. The fluid will largely flow through the screen while the particles will drop downwardly into a second stream particulate discharge exit 660. The fluid meanwhile, will exit the apparatus through second stream fluid component exit 580.

Some embodiments of the invention include a method for removing agglomerates from a slurry comprising a transport fluid, particulates, and agglomerates formed from the particulates. In some embodiments, the method comprises the steps of causing the slurry to flow through a deceleration zone and past a flow divider to divide the slurry stream into a first slurry stream and a second slurry stream. Embodiments of the invention also include removing agglomerates from the first slurry stream by channeling the first slurry stream into the first agglomerate removal unit and removing agglomerates from the second slurry stream by channeling the second slurry stream into the second agglomerate removal unit. Other embodiments of the invention further include separating the slurry transport fluid from the slurry particles from the first and second slurry streams by channeling the first slurry stream into a first dewatering unit and by channeling the second slurry stream into a second dewatering unit.

In the foregoing detailed description, the invention has been described with reference to specific embodiments. However, it may be appreciated that various modifications and changes can be made without departing from the scope of the invention as set forth in the appended claims.

The invention claimed is:

1. A slurry dividing apparatus, comprising:
a main flow channel including a slurry inlet opening, an inlet zone in fluid communication with, and extending from, the inlet opening, and a deceleration zone in fluid communication with, and extending upward from, the inlet zone toward an upper end of the main flow channel, the deceleration zone having a cross-sectional area that increases with an increasing elevation of the deceleration zone;
a flow divider terminating the upper end of the main flow channel;
a first branch flow channel and a second branch flow channel, each of the branch flow channels in fluid communication with the main flow channel and extending upward from the flow divider;
one or more weirs extending across an upper portion of the first branch flow channel and an upper portion of the second branch flow channel, the one or more weirs being at the same vertical elevation in both the first and second branch flow channels; and
a first discharge flow channel and a second discharge flow channel, the first and second discharge flow channels in fluid communication with the first and second branch flow channels, respectively, and extending downward from the weir of the corresponding branch flow channel, the slurry inlet opening being at an elevation below the one or more weirs.

2. The apparatus of claim 1, wherein the cross-sectional area of the deceleration zone of the main flow channel expands in a linear fashion.

3. The apparatus of claim 1, wherein the deceleration zone of the main flow channel is bounded by opposing sidewalls that taper outward from one another, with increasing elevation, at an angle of less than or equal to approximately ten degrees.

4. The apparatus of claim 1, wherein the upper end of the main flow channel is coincident with an upper end of the deceleration zone of the main flow channel.

5. The apparatus of claim 1, wherein each of the discharge flow channels includes a slurry outlet opening and an acceleration zone extending downward toward the slurry outlet opening, each acceleration zone having a cross-sectional area that decreases with a decreasing elevation of the deceleration zone.

6. The apparatus of claim 5, wherein a cross-sectional area of the slurry inlet opening is approximately equivalent to the sum of cross-sectional areas of each of the slurry outlet openings.

7. The apparatus of claim 5, wherein an elevation of the slurry inlet opening is less than an elevation of each of the slurry outlet openings.

8. The apparatus of claim 5, wherein each of the slurry outlet openings has a round cross-sectional area.

9. The apparatus of claim 1, wherein each of the branch flow channels has approximately the same cross-sectional area.

10. The apparatus of claim 1, wherein each of the branch flow channels has an approximately constant cross-sectional area.

11. The apparatus of claim 1, further comprising a valve and a corresponding bypass flow channel located between one of the plurality of branch flow channels and one of the plurality of discharge flow channels, the bypass flow channel providing a flow pathway to bypass the weir corresponding to the one of the plurality of branch flow channels.

12. The apparatus of claim 1, wherein the deceleration zone of the main flow channel extends vertically upward.

13. The apparatus of claim 1, wherein each of the branch flow channels extends vertically upward.

14. The apparatus of claim 1, wherein each of the discharge flow channels extends vertically downward.

15. The apparatus of claim 1, wherein the weir extends horizontally across the upper portion of each branch flow channel.

16. The apparatus of claim 1, wherein the slurry inlet opening has a round cross-sectional area.

17. The apparatus of claim 1, wherein the main flow channel has a rectangular cross-sectional area.

18. The apparatus of claim 1, wherein each of the branch flow channels have a rectangular cross-sectional area.

19. The apparatus of claim 1, wherein each of the discharge flow channels have a rectangular cross-section.

20. The apparatus of claim 1, wherein each of the discharge flow channels feeds into an independent agglomerate removal and dewatering unit.

21. A slurry dividing and agglomerate removal apparatus, comprising:
a main flow channel including a slurry inlet opening, an inlet zone in fluid communication with, and extending from, the inlet opening, and a deceleration zone in fluid communication with, and extending upward from, the inlet zone toward an upper end of the main flow channel, the deceleration zone having a cross-sectional area that increases with an increasing elevation of the deceleration zone;
a flow divider terminating the upper end of the main flow channel;
at least two branch flow channels, each of the branch flow channels in fluid communication with the main flow channel and extending upward from the flow divider;

one or more weirs extending across an upper portion of each of the branch flow channels, the one or more weirs being at the same vertical elevation in each of the branch flow channels; and a separate agglomerate removal unit in communication with each branch flow channel, the slurry inlet opening being at an elevation below the one or more weirs.

22. A method of dividing a slurry having a plurality of particles suspended in a transport fluid, the method comprising:

causing the slurry to flow in a main flow channel including a slurry inlet opening, an inlet zone in fluid communication with, and extending upward from, the inlet opening, and a deceleration zone in fluid communication with, and extending upward from, the inlet zone toward an upper end of the main flow channel, the deceleration zone having a cross-sectional area that increases with an increasing elevation of the deceleration zone;

dividing the slurry into a first constituent stream and a second constituent stream with a flow divider terminating the upper end of the main flow channel such that the first and second constituent streams flow through first and second branch flow channels, respectively, each of the branch flow channels in fluid communication with the main flow channel and extending upward from the flow divider, the first and second constituent streams encountering a first weir and a second weir, respectively, the first and second weirs being at the same vertical elevation, and the slurry being in laminar flow at the first and second weirs; and discharging the first and second constituent streams, respectively, through first and second discharge flow channels and/or first and second agglomerate removal units.

23. The method of claim 22, further including the step of removing agglomerates from the first and second constituent slurry streams in the first and second agglomerate removal units.

\* \* \* \* \*